(12) United States Patent
Drako (10) Patent No.: US 10,607,462 B2
(45) Date of Patent: Mar. 31, 2020

(54) AERIAL IMAGING PRIVACY ENHANCEMENT SYSTEM

(71) Applicant: Dean Drako, Austin, TX (US)

(72) Inventor: Dean Drako, Austin, TX (US)

(73) Assignee: EAGLE EYE NETWORKS, INC., Austin, TX (US)

( * ) Notice: Subject to any disclaimer, the term of this patent is extended or adjusted under 35 U.S.C. 154(b) by 0 days.

(21) Appl. No.: 16/524,131

(22) Filed: Jul. 28, 2019

(65) Prior Publication Data

US 2019/0371140 A1  Dec. 5, 2019

Related U.S. Application Data

(63) Continuation-in-part of application No. 15/814,356, filed on Nov. 15, 2017, now Pat. No. 10,440,229.

(51) Int. Cl.

| | |
|---|---|
| *G08B 13/196* | (2006.01) |
| *H04N 7/18* | (2006.01) |
| *G06T 7/20* | (2017.01) |
| *G06T 7/13* | (2017.01) |
| *H04N 19/30* | (2014.01) |
| *H04N 19/20* | (2014.01) |
| *H04N 19/513* | (2014.01) |

(Continued)

(52) U.S. Cl.
CPC ........ *G08B 13/1961* (2013.01); *B64C 39/024* (2013.01); *G06T 7/13* (2017.01); *G06T 7/20* (2013.01); *G08B 13/19686* (2013.01); *H04N 5/247* (2013.01); *H04N 7/185* (2013.01); *H04N 19/20* (2014.11); *H04N 19/30* (2014.11); *H04N 19/513* (2014.11); *B64C 2201/123* (2013.01); *B64C 2201/127* (2013.01); *G06T 2207/10016* (2013.01); *G06T 2207/10032* (2013.01); *G06T 2207/30232* (2013.01)

(58) Field of Classification Search
CPC ........... H04N 1/448; G06T 7/292; G06T 7/13; G06T 2207/10032; G06T 2207/30232
See application file for complete search history.

(56) References Cited

U.S. PATENT DOCUMENTS

9,483,950 B2 * 11/2016 Wang .................... G05D 1/0214
9,805,273 B1 * 10/2017 Seeber .................... G06T 7/223
(Continued)

*Primary Examiner* — Kim Y Vu
*Assistant Examiner* — Molly Delaney
(74) *Attorney, Agent, or Firm* — Patentry; Peter G. H. Hwang (57) ABSTRACT

A camera-based security system protects an asset by detecting an aerial surveillor and consequently storing notifications into a video archive, alerting to an operator console, and actuating privation apparatus. One or more cameras provides video streams to a processor which derives object motion. Attributes of object motion trigger notification to record and alert on conditions associated with an aerial surveillor. Tracking of pixels, pixel blocks, and motion vectors enable rules based determination of an airborne surveillance vehicle according to characteristic hovering or lingering by masking LSB of accumulated positive and negative movements. Actuators cause privation enhancement apparatus to obfuscate the protected asset (structure, area, or volume) or to interpose between the protected asset and the surveillor. The method traces a travel path of an object; and determines a ray from a private property to a surveillor drone.

4 Claims, 8 Drawing Sheets

(51) Int. Cl.
*B64C 39/02* (2006.01)
*H04N 5/247* (2006.01)

(56) References Cited

U.S. PATENT DOCUMENTS

| | | | |
|---|---|---|---|
| 9,862,489 B1* | 1/2018 | Weinstein | B64C 39/024 |
| 10,051,475 B2* | 8/2018 | Shattil | H04L 27/265 |
| 10,239,637 B2* | 3/2019 | Ashdown | B64F 1/02 |
| 2006/0045185 A1* | 3/2006 | Kiryati | G08B 13/19602 |
| | | | 375/240.16 |
| 2006/0093228 A1* | 5/2006 | Loukianov | H04N 7/012 |
| | | | 382/236 |
| 2017/0039413 A1* | 2/2017 | Nadler | G06K 9/6201 |
| 2017/0148467 A1* | 5/2017 | Franklin | G10L 25/51 |
| 2017/0285142 A1* | 10/2017 | Parker | G01S 3/782 |
| 2019/0197345 A1* | 6/2019 | Sawada | G06T 7/00 |

* cited by examiner

AERIAL IMAGING PRIVACY ENHANCEMENT SYSTEM

CROSS-REFERENCES TO RELATED APPLICATIONS

The present application is a Continuation-In-Part of Ser. No. 15/814,356 application, filed Nov. 15, 2017 entitled Aerial Imaging Privacy Enhancement System which is incorporated by reference in its entirety and provides its priority date.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The present invention relates to visual privacy control and detection of aerial drones conducting surveillance by transforming at least one video stream.

Description of the Related Art

Digital cameras are increasingly portable and higher resolution. They are frequently combined with radio controlled aircraft to enable peering into windows and enclosed land without physically intruding over fences and property lines. Digital cameras transmit images in the form of bit maps in various formats both compressed and uncompressed such as MPEG and PEG standards, which continuously evolve.

Within video compression, a motion vector is the key element in the motion estimation process. It is used to represent a macroblock in a picture based on the position of this macroblock (or a similar one) in another picture, called the reference picture.

The H.264/MPEG-4 AVC standard defines motion vector as: A two-dimensional vector used for inter prediction that provides an offset from the coordinates in the decoded picture to the coordinates in a reference picture.

Even without decoding motion vectors from video streams, the location of pixel blocks with content are easily distinguished from pixel blocks of sky background by their frequency coefficients. The scan order of these blocks can be tracked over time between consecutive video frames providing translation in one or two dimensions of one or more pixel blocks across the frame.

As is known, in 2013, the ITU announced the completion of the first stage approval of the H.265 video codec standard. HEVC re-uses many of the concept defined in H.264. Both are block based video encoding techniques: 1. subdivision of picture in macroblocks, eventually sub-divided in blocks 2. reduction of spatial redundancy using intra-frame compression techniques 3. reduction of temporal redundancy using inter-frame compression techniques (motion estimation and compensation) 4. residual data compression using transformation & quantization 5. reduction of final redundancy . . . using entropy coding.

Picture Partitioning

HEVC divides pictures into "coding tree blocks" (CTBs). Depending by an encoding setting the size of the CTB can be of 64.times.64 or limited to 32.times.32 or 16.times.16. Each CTB can be split recursively, in a quad-tree structure, in 32.times.32, 16.times.16 down to 8.times.8 sub-regions, called coding units (CUs).

CUs are the basic unit of prediction in HEVC. Usually smaller CUs are used around detailed areas (edges and so on), while bigger CUs are used to predict flat areas.

Transform Size

Each CU can be recursively split in Transform Units (TUs). HEVC has several transform sizes: 32.times.32, 16.times.16, 8.times.8 and 4.times.4. Bigger TUs are able to encode better stationary signals while smaller TUs are better in encoding smaller "impulsive" signals. The transforms are based on DCT (Discrete Cosine Transform), Prediction Units A CU can be predicted using one of eight partition modes. Even if a CU contains one, two or four prediction units (PUs), it can be predicted using exclusively inter-frame or intra-frame prediction technique. Inter-coded CUs can use both square and asymmetric partitions.

As is known from H.264 Motion Estimation and Applications Murali E. Krishnan, E. Gangadharan and Nirmal P. Kumar Anand Institute of Higher Technology, Anna University, India from the book Video Compression: "Motion estimation techniques form the core of H.264/AVC (lain Richardson, 2010) video compression and video processing applications. It extracts motion information from the video sequence where the motion is typically represented using a motion vector (x, y). The motion vector indicates the displacement of a pixel or a pixel block from the current location due to motion. This information is used in video compression to find best matching block in reference frame to calculate low energy residue to generate temporally interpolated frames. It is also used in applications such motion compensated de-interlacing, video stabilization, motion tracking etc. Block Matching Algorithm (BMA) (IEG Richardson 2003) is the most popular motion estimation algorithm. BMA calculates motion vector for an entire block of pixels instead of individual pixels. The same motion vector is applicable to all the pixels in the block. This reduces computational requirement and also results in a more accurate motion vector since the objects are typically a cluster of pixels.

The reference pixel block is generated by displacement from the current block's location in the reference frame. The displacement is provided by the Motion Vector (MV). MV consists of is a pair (x, y) of horizontal and vertical displacement values. There are various criteria available for calculating block matching.

Within this application, Applicants define a motion object to be a group of pixel blocks that substantially travel together across a stationary backdrop derived from comparison of sequential frames. This would also be described as regional motion.

Of course, due to perspective, the shape of the object will change with respect to the video frame as it translates across the video field of view especially with a fisheye or wide angle type of lens. But tracking the center of mass or center of pixels is sufficient for detection of a surveillor. Advantageously, the anticipated motion of a surveillor is initially approaching from a distance and only upon increasing proximity, growing from few pixel blocks to many blocks.

As is known, in *United States v. Dunn* (1987), the Court provided guidance, saying that, "curtilage questions should be resolved with particular reference to four factors: the proximity of the area claimed to be curtilage to the home, whether the area is included within an enclosure surrounding the home, the nature of the uses to which the area is put, and the steps taken by the resident to protect the area from observation by people passing by."

What is needed is a system which improves privacy of protected assets such as residences, structures, beaches, pools, enclosures, farms, ranches, yards, campuses and their occupants from airborne sensors which can peek above conventional fences.

What is needed is steps to protect an area from observation by detection and frustration of aerial drones conducting intrusive surveillance over a protected asset such as a structure, area, or venue.

SUMMARY OF THE INVENTION

A system protects an asset from surveillance by aerial drones by detecting hovering or lingering behavior. Upon notification, actuators of the system cause alteration to the optical affect of the protected asset or interposition between the protected asset and the surveillor.

A camera-based security system protects an asset by detecting an aerial surveillor and consequently storing notifications into a video archive, alerting to an operator console, and actuating privation apparatus.

An object moving against a backdrop may be detected as a block, an edge, or a pixel which travels in a coordinated path in at least two video streams. These could be conventional aircraft in transit or biologic organism under wing power.

At least one camera provides a video stream to a processor which derives object motion.

Over a sequence of video images, an object can be tracked in yaw, and elevation over time. More simply, within a stream of images, object motion can be accumulated from frame to frame as positive or negative horizontal movement, positive or negative vertical movement, and a combination of both. The apparatus accumulates positive and negative steps in a horizontal register and positive and negative steps in a vertical register over a stream of video frames. The least significant bits are masked out to eliminate relatively small motion. When the most significant bits of either vertical register or horizontal register are zero, a malingering flag is set for the object.

Attributes of object motion trigger notification to record and alert on conditions associated with an aerial surveillor.

When an object recedes and subsequently approaches; moves in a path having both concave and convex curves; sharply changes direction or speed; or lingers within a hierarchical tile of visual field, the video stream is annotated and flagged for display on an operator console.

Tracking of pixels, pixel blocks, and motion vectors enable rules based determination of an airborne surveillance vehicle according to characteristic hovering or lingering.

Objects which over time are associated with a greater number of pixels or pixel blocks without moving up, down, or horizontally shall trigger alerts or notifications because they are approaching a camera.

Objects which have both positive and negative vertical motion and positive and negative horizontal motion shall trigger an alert or notification. Objects which enter and leave a hierarchical view tile through the same edge are of most interest.

Actuators cause privation enhancement apparatus to obfuscate the protected asset (structure, area, or volume) or to interpose between the protected asset and the surveillor.

Actuators may alter opacity, reflectivity, or transparency of windows, wind screens, roofs, doors, and skylights.

Actuators may raise, lower, or close blinds, curtains, roofs, and shades.

Actuators may increase, decrease, or fluctuate illumination both inward and outward facing.

Actuators may enable irrigation or fire prevention pumps and sprays.

Actuators may interpose streams of foam, bubbles, water, particulates, droplets, and reflectors between the protected asset and the surveillor.

Actuators may interpose an aerial vehicle between the surveillor and the protected asset or alter the environmental flight dynamics of the surveillor.

A method obfuscates a protected asset when it determines surveillance by a surveillance aircraft or drone.

Optical sensors determine that a remotely operated aircraft (surveillor) is non-transient in its apparent path above the horizon of an asset and within boundary such as a property line.

A non-transient path is determined when an object in a visual field reenters a cell of a pixel block a plurality of times without leaving the edge of the sensor view.

The method obfuscates imagery by changing geometry, opacity, transparency, reflectivity, and illumination of the protected asset.

A method of operation for a privacy enhancement system includes but is not limited to: tracing a travel path of an object across a display to determine at least one surveillor drone in flight; determining a ray from a private property to a surveillor drove, determining range to a surveillor drone by delay, operating a pan and zoom optical sensor to image a plurality of drones with boundary frames, orienting the optical sensor when a drone image impinges upon boundary frame, determining angular direction of each ray, transmitting polar coordinates of each surveillor drone with an alert to a security service; and actuating an optical shield of private property which is incident to the ray by one of determining which optical shields are exposed to the ray, and controlling emission/opacity/polarization in the direction of the ray.

Upon determination of a suspected surveillance drone in its protected zone, the system further operates by modifying its own illumination of private property which may obfuscate external image taking. The system may operate to modify the geometry or reflectivity of structures in the private property. The system may interpose optical barriers such as ink, dies, water spray, fog, smoke, bubbles, curtains, walls, roofs, balloons, and biological agents which modify transparency of air or water.

While complying with property law of the land and international rules of engagement, the system operates to fend off or thrust or propel the surveillor drone beyond a threshold distance. In an embodiment, fans create a force on the surveillor drone having a radial component away from the private property. Flight dynamics of the surveillor drone may be modified by accreting lift or mass to it. For example, birds, ice, balloons, mud, glue would change the balance of forces. In an embodiment, the system illuminates the surveillor drone as part of identification which in turn may saturate the sensor package of its optical instruments. A message may be directed onto the sensor receptor array just as virtual reality goggles drive a retina. RC signals such as received in the vicinity of the surveillor drone may be amplified and played back using a directional beam antenna with delay similar to multipath.

Additionally, the system stores into an airborne platform apparatus component images of the private property and at least one surveillor drone. The images of the private property may be holographic or a 3-dimensional model. The airborne platform receives an assignment to screen one surveillor drone by traveling on a ray from the private property toward the surveillor drone. In one embodiment, the airborne platform expands or inflates to eclipse the optical sensors of the surveillor drone. In another embodiment, the airborne platform closely tracks the movements of the surveillor drone to retain an interior interposition. In all movements, the airborne platform has the inside track by using a rear facing camera to match with the holographic or 3-dimensional model of the private property.

Additionally, the airborne platform apparatus component of the system operates to determine a downlink channel on which the surveillor drone is transmitting. When at least one image of the private property has been transmitted by the surveillor drone using the downlink channel, the airborne platform attempts to determine a direction for the downlink intended destination and to interpose itself between the downlink intended destination and the surveillor drone. Additionally, the airborne platform transmits imagery of the surveillor drone. Additionally, the airborne platform transmits a privacy notification. When both a downlink channel and a destination is determined, the airborne platform transmits a combined notification and image of the surveillor drone by a directional antenna and masks the surveillor drone from one of the private property and the downlink destination.

The surveillor drone is further expelled from the volume of curtilage of the protected asset.

BRIEF DESCRIPTION OF THE SEVERAL VIEWS OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

As is known, video streams can be decoded into frames which contain blocks of pixels as well as frequency domain parameters which include motion vectors and frequency coefficients.

In an embodiment, a method includes the processes of operation of a privacy security system comprising: capturing by an optical instrument at least one stream of compressed video frames; decoding said stream into pixel blocks of frequency coefficients; determining at least one pixel block containing a corner or an edge by characteristic frequency coefficients; determining a motion object by comparing each video frame with a subsequent frame; storing locations of the motion object over a sequence of video frames; reading stored thresholds of linger-time, motion, flight path parameters, and video block occupancy; correlating locations of the motion object with at least one of infrared cameras, radar, LIDAR, and sonar whereby range to the motion object is estimated; and adding an indicia of location to a display of said video file presented to a security system operator.

One aspect of the invention is a system that detects and alerts on a proximate airborne surveillance apparatus (surveillor). The detection is performed by a circuit that receives a sequence of video frames from at least one camera. Methods transform bit maps of pixels, pixel blocks, or motion vectors into travel paths of objects. A surveillor alert is annotated to a display and to a video archive on the condition that one of the travel paths hover or malinger. The system further actuates at least one privation apparatus to operate in a direction determined by the surveillor alert.

A learning system is trained to recognize hovering or malingering travel paths by operating a test drone in the range of the cameras.

Figure 2:
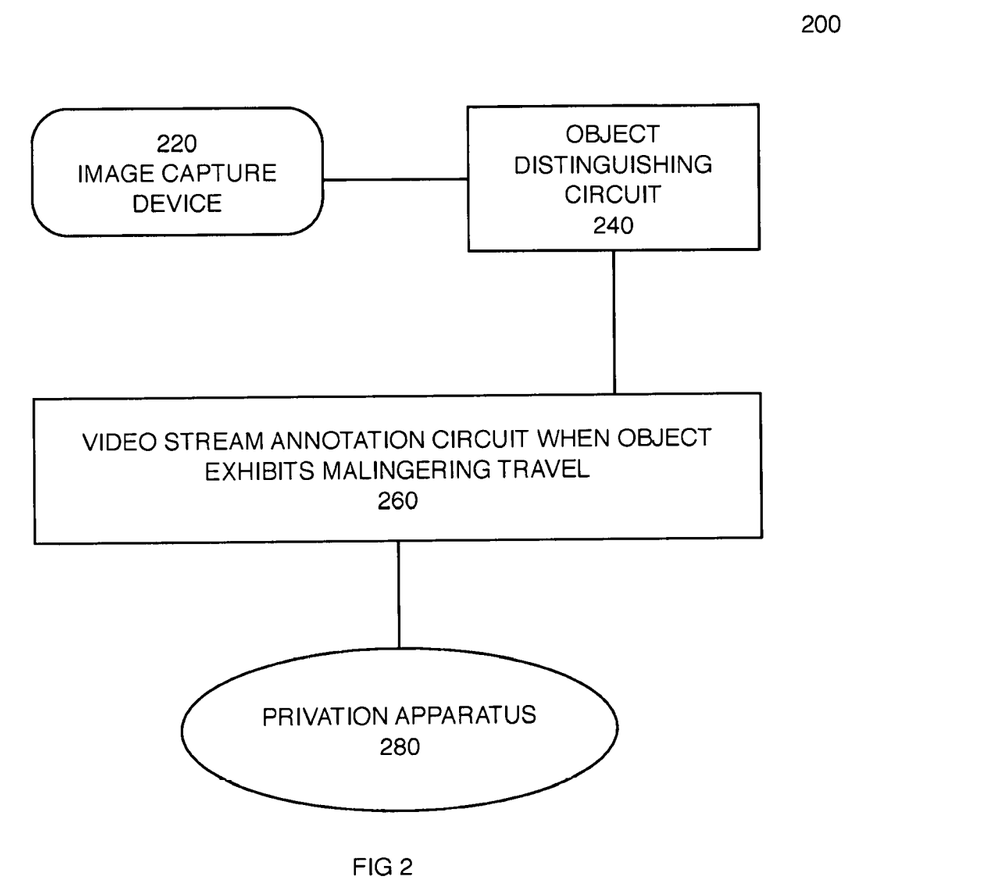
FIG. 2 is a block diagram of a system.

FIG. 2 is a block diagram of a system.

A system 200 is comprised of processes and apparatuses including an image capture device (cameras) 220, a circuit to determine travel by an object distinguishable from a background in a sequence of images 240, a circuit to annotate a video stream with alerts on the condition the object exhibits malingering travel 260, and a privation apparatus 280.

Figure 3:
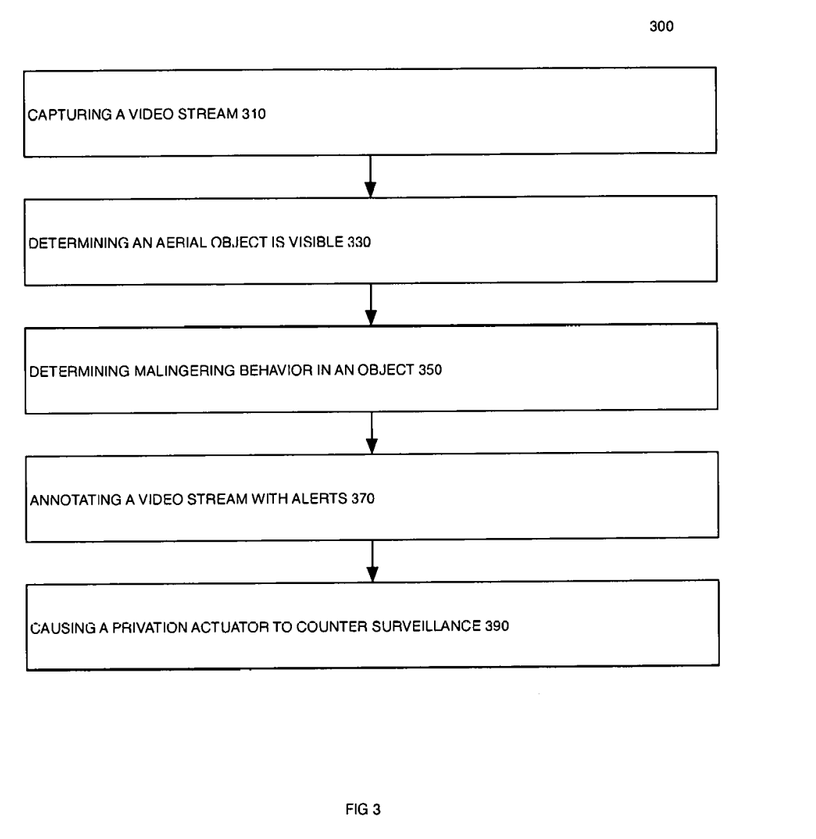
FIG. 3 is a flowchart of steps or processes in a 1.sup.st method for operating a system.

FIG. 3 is a flowchart of steps or processes in a 1st method for operating a system.

A process 300 includes steps comprising: capturing a video stream 310; determining an aerial object is visible 330, determining malingering behavior in an object 350, annotating a video stream with alerts 370, and causing privation actuator to counter surveillance 390.

Figure 4:
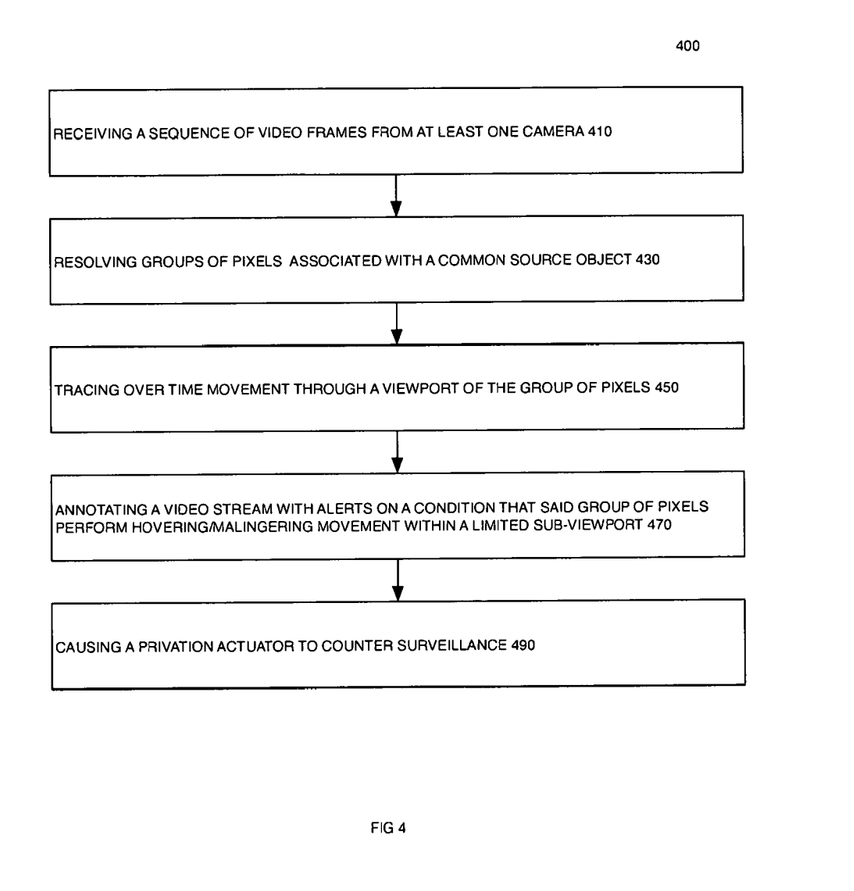
FIG. 4 is a flowchart of steps or processes in a second method of operating on a plurality of bitmaps.

FIG. 4 is a flowchart of steps or processes in a second method of operating on a plurality of bitmaps.

A process 400 includes steps comprising: receiving from at least one camera a sequence of video frames 410, resolving groups of pixels that can be associated with a common source object 430, tracing over time movement through a viewport of the group of pixels 450, annotating a video stream with alerts on a condition that said group of pixels perform hovering/malingering movement with a limited sub-viewport 470, and causing a privation actuator to counter surveillance 490.

Figure 5:
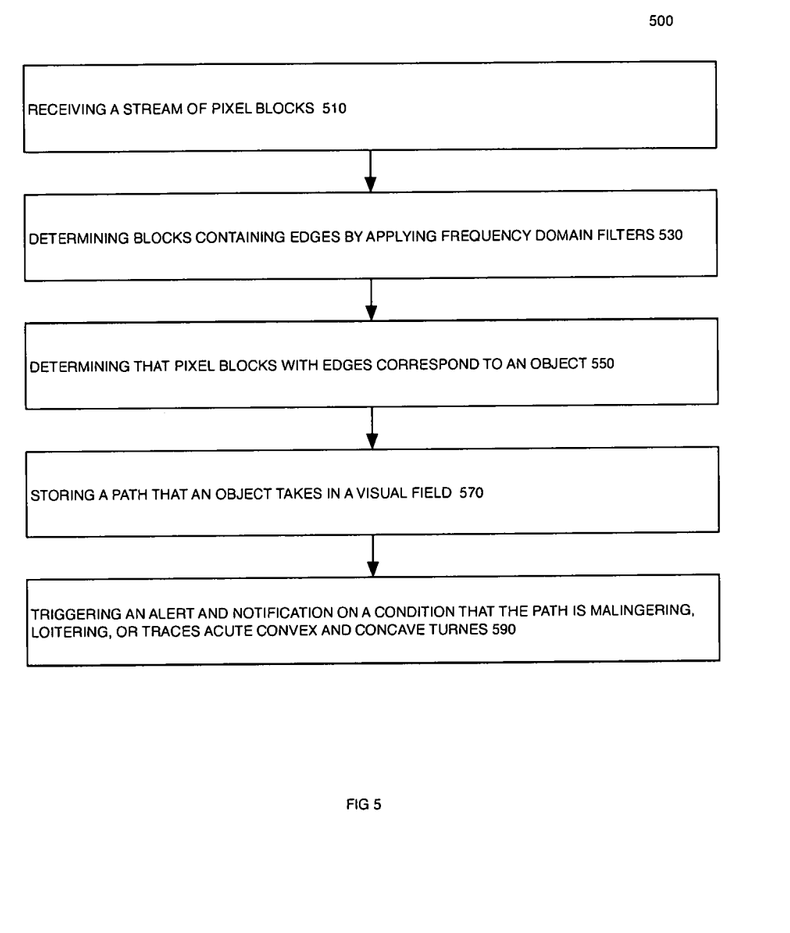
FIG. 5 is a flowchart of steps or processes in a third method of operating on a plurality of pixel blocks.

FIG. 5 is a flowchart of steps or processes in a third method of operating on a plurality of pixel blocks.

A process 500 includes steps comprising: receiving a stream of pixel blocks 510, determining blocks containing edges by applying frequency domain filters 530, determining that pixel blocks with edges correspond to an object 550, storing a path that an object takes in a visual field 570, and triggering an alert and notification on a condition that the path is malingering, loitering, or traces acute convex and concave turns 590.

Figure 6:
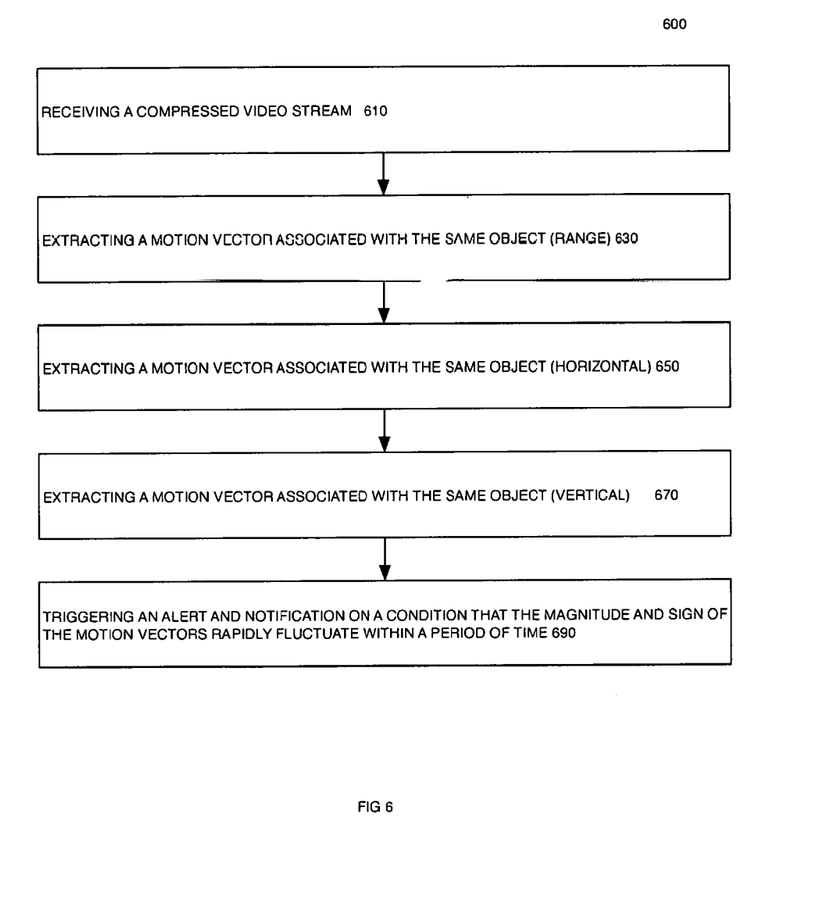
FIG. 6 is a flowchart of steps or processes in a fourth method of operating on a plurality of stereoscopic motion vectors.

FIG. 6 is a flowchart of steps or processes in a fourth method of operating on a plurality of stereoscopic motion vectors.

A process 600 includes steps comprising: receiving a compressed video stream 610, extracting motion vectors which are associated with the same object 630, 650, 670, and triggering an alert and notification on a condition that the magnitude and sign of the motion vectors rapidly fluctuate within a period of time 690.

Figure 7:
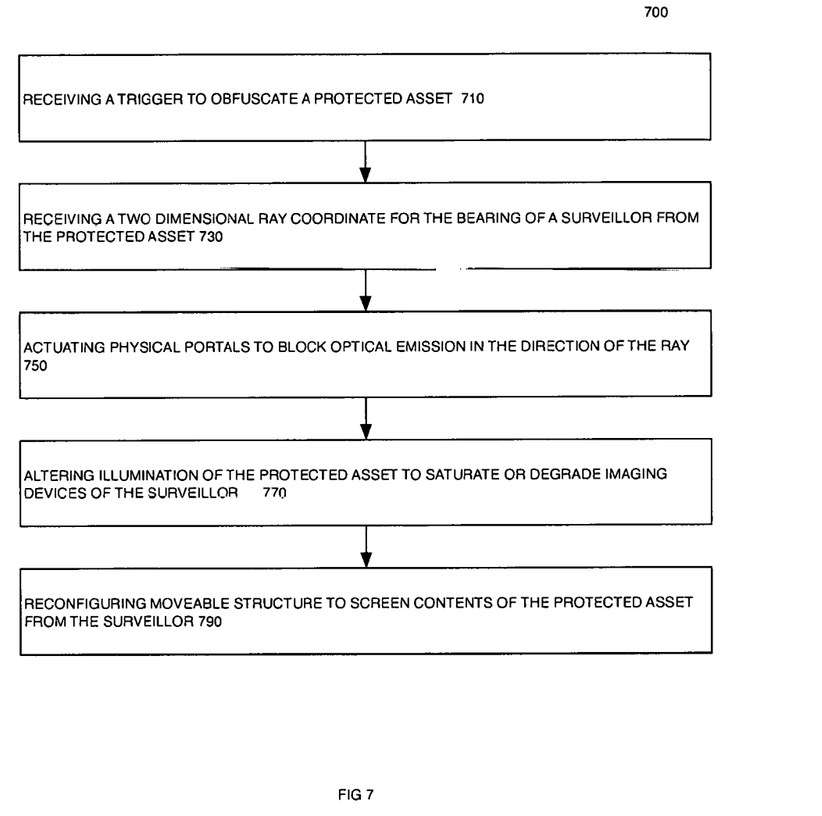
FIG. 7 is a flowchart of steps or processes in a fifth method of controlling obfuscation.

FIG. 7 is a flowchart of steps or processes in a fifth method of controlling obfuscation.

A process 700 includes steps comprising: receiving a trigger to obfuscate a protected asset 710; receiving a two dimensional ray coordinate for the bearing of a surveillor from the protected asset 730; actuating physical portals to block optical emission in the direction of the ray 750; altering illumination of the protected asset to saturate or degrade imaging devices of the surveillor 770; and reconfiguring movable structure to screen contents of the protected asset from the surveillor 790.

Figure 8:
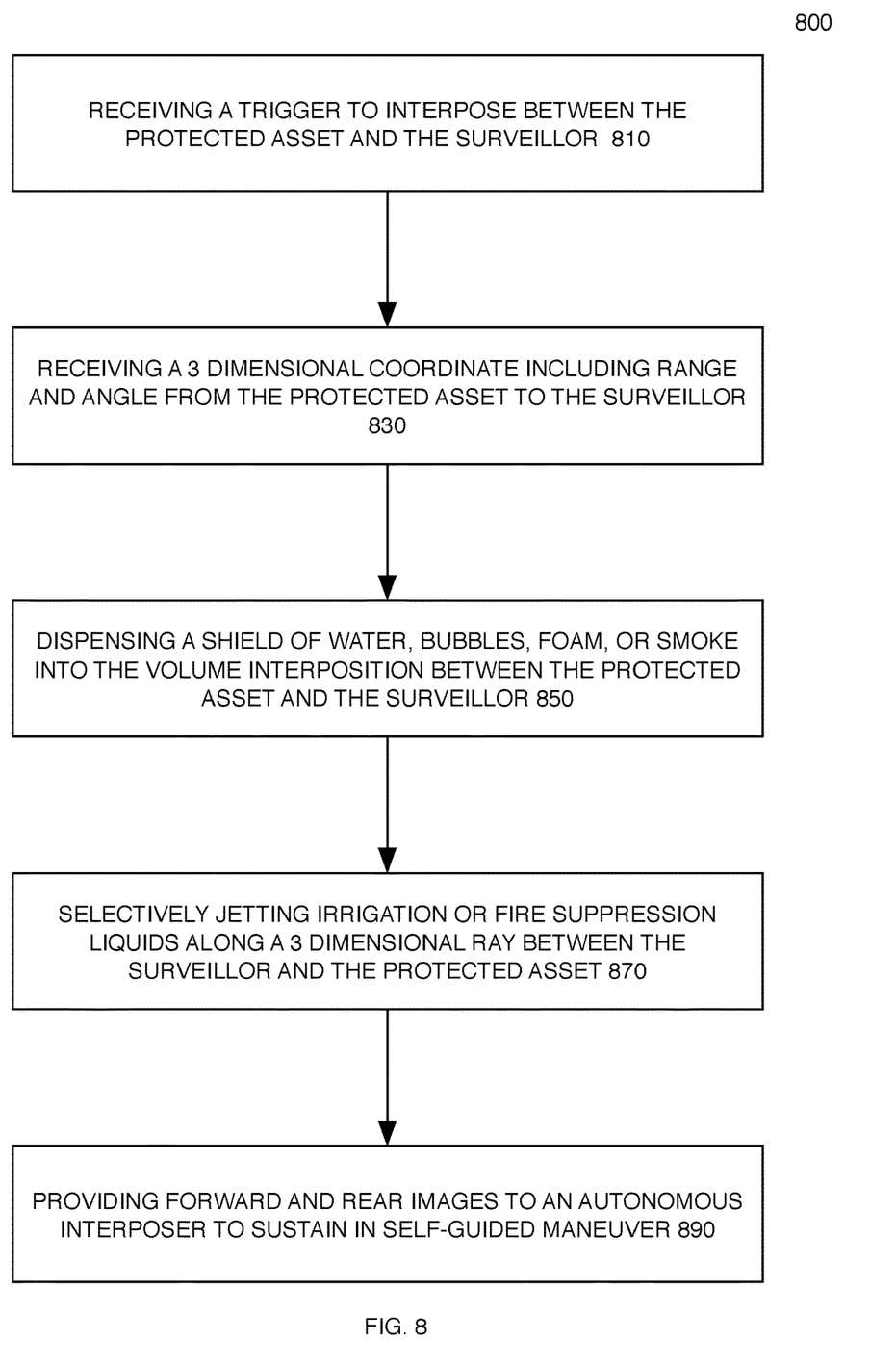
FIG. 8 is a flowchart of steps or processes in a sixth method of controlling interposition.

FIG. 8 is a flowchart of steps or processes in a sixth method of controlling interposition.

A process 800 includes steps comprising: receiving a trigger to interpose between the protected asset and the surveillor 810, receiving a 3 dimensional coordinate including range and angle from the protected asset and the surveillor 830, dispensing a shield of water, bubbles, foam, smoke into the volume interposition between the protected asset and the surveillor 850, selectively jetting irrigation or fire suppression liquids along a 3 dimensional ray between the surveillor and the protected asset 870, and providing forward and rear images to an autonomous interposer to sustain in self-guided maneuver 890.

A method for determining hovering/malingering behavior comprises: upon a key frame or a period of time reading vertical movement register through a mask of least significant bits; reading a horizontal movement register through a mask of least significant bits; when the most significant bits of the vertical movement register are non-zero, triggering a hovering/malingering behavior alert; when the most significant bits of the horizontal movement register are non-zero, triggering a hovering/malingering behavior alert; incrementing the vertical movement register proportionately to upward movements; decrementing the vertical movement register proportionately to downward movements; incrementing the horizontal movement register proportionately to rightward movements; decrementing the horizontal movement register proportionately to leftward movements; and periodically resetting both movement registers to zero.

A system identifies a potential surveillor based on optical measures of behavior over time and determines a bearing and in an embodiment, a range. This directional information is provided to an alert system which activates a privacy system to distort the appearance of the protected asset in the direction of the surveillor. Actuators may control opacity or illumination of doors, windows, roofs, walls, areas, screens, and aerial platforms. In an embodiment, the aerial platform contains a front facing camera and a rear facing camera to enable interposition on a ray between the protected asset and the surveillor. In an embodiment, the aerial platform includes a notification system that presents a privacy message into the sensor package of the surveillor. In an embodiment, the aerial platform includes a transceiver to amplify, transform, and synthesize images and reiterate control signals received in the vicinity of the surveillor generally as well as toward the remote controller of the surveillor.

The privacy protection system includes: at least one optical sensor, a potential surveillor identification and location system; an alert system; a privacy actuator system; an aerial platform controller; and a non-transitory storage for image coefficients, and computer executable instructions.

One aspect of the invention is a method that transforms at least one stream of compressed video files into surveillance alerts and notifications by performance in a processor: determining a motion object by comparing each video frame with a subsequent frame; reading stored thresholds of linger-time, motion, flight path parameters, and video block occupancy; and decoding motion vectors from the video files.

In an embodiment, the method also includes: comparing motion vectors to a motion magnitude threshold; and triggering a surveillance alert and notification on the condition that the motion vectors exceed the motion threshold in both one positive and one negative variance.

In an embodiment, the method also includes: decrementing from a linger-time threshold the number of motion vectors associated with a motion object; and triggering a surveillance alert and notification on the condition that the number of motion vectors associated with a motion object exceeds a linger-time threshold.

In an embodiment, the method also includes: accumulating motion vectors for a block; and triggering a surveillance alert and notification on the condition that the accumulation of motion vectors exceeds 360 degrees in at least one of vertical and horizontal.

In an embodiment, the method also includes: storing motion vectors for a block; determining a repeating pattern for motion vectors of a block; and triggering a surveillance alert and notification.

In an embodiment, the method includes: partitioning a video frame into a plurality of path polygons; annotating each polygon each time a motion object enters; annotating each polygon each time the motion object exits; and predicting the next polygon to be entered based on smoothing a path.

In an embodiment, the method also includes: determining the condition that a motion object has created a loop by exiting a first polygon and reentering the first polygon from a different direction; and triggering a surveillance alert and notification.

In an embodiment, the method also includes: determining the condition that a motion object has lingered within a polygon beyond a linger-time threshold; and triggering a surveillance alert and notification.

In an embodiment, the method also includes: determining the condition that a motion object is loitering by entering and exiting all the polygons in an area of the frame; and triggering a surveillance alert and notification.

In an embodiment, the method also includes: determining the condition that a motion object enters a polygon inconsistent with traveling a smooth path; and triggering a surveillance alert and notification.

In another embodiment, the at least one stream of compressed video is a multi-stream of partially overlapping viewports whereby stereoscopic blocks of image data include 3D motion vectors.

In an embodiment, the method also includes: storing the three-dimensional motion vector of an object over a period; and alerting the privacy security system when the range of the surveillor to the protected asset remains substantially constant during the period.

In an embodiment, the method also includes: alerting the privacy security system when the range of the surveillor to the protected asset increases and subsequently decreases during the period.

In an embodiment, the method also includes: alerting the privacy security system when the surveillor passes through more than one-half of the overlapping viewports.

The invention further includes the steps: synthesizing notification imagery to disincentivize photographic recording; and projecting said notification imagery into the viewpoint of the surveillor. In an embodiment, projecting said notification imagery includes: emitting particles; and emitting electro-magnetic signals which impinge the particles. In an embodiment projecting said notification imagery includes: emitting aerosol liquid droplets; and emitting electro-magnetic signals which impinge the aerosol liquid droplets. In an embodiment, projecting said notification imagery includes: deploying flexible fabric screens. In an embodiment, projecting said notification imagery includes but is not limited to: determining fence and structural surfaces in the observable range of the surveillor; and displaying a notification image synthesized with perspective, aspect ratios, and rotation oriented toward the direction of the surveillor.

Another aspect of the invention is a system embodiment having: actuators to change transparency, opacity, and geometry of a protected asset upon receiving an alert of a surveillor; communication circuits to synthesize and present a privacy notification to a surveillor; at least one optical sensor system providing at least one compressed video stream; and a processor coupled to a store for instructions and streams of compressed video files. Another aspect of the invention is an airborne platform which is interposed between the surveillor and the protected asset.

A system embodiment includes at least one image capture device (cameras), a processor, a non-transitory computer readable store, actuators for autonomous aerial interposition apparatus, and a communication network coupled to all the preceding apparatuses, wherein said autonomous aerial interposition apparatus comprises a front facing camera and a back facing camera.

A method embodiment for operating a privacy enhancement system includes: receiving a series of images from at least one image capture devices (cameras); resolving the images to pixel maps; determining pixels that are substantially distinguished from a background at a co-location; associating a plurality of pixels with an airborne surveillor; recording motion of said airborne surveillor across a hierarchical tile map superposed on a pixel map; determining that said airborne surveillor persistently occupies a hierarchical tile map during said series of images; setting an intrusion/surveillance flag on an image of the airborne object displayed to a security console; and, privating a protected asset.

In an embodiment, privating includes interposing at least one of kites, curtains flags, drapery, roofs, doors, screens, and assigning movement of a powered self-orienting aerial vehicle into the line-of-sight between the protected asset and the airborne surveillor.

In an embodiment, privating includes obfuscating exterior visibility into a protected asset by one of illumination, opacity of medium, environmental temperature, volume, pressure, and particulates.

Another method embodiment for operation of a privacy security system includes: capturing by an optical instrument at least one stream of video files; decoding said stream into pixel blocks of frequency coefficients; determining at least one pixel block containing an edge by characteristic frequency coefficients; compressing said stream of video files; determining a motion event upon a change in compression efficiency; determining a motion object by selecting pixel blocks with degraded compression efficiency; storing locations of the motion object over a sequence of video frames; reading stored thresholds of motion, flight path parameters, and video block occupancy; correlating locations of the motion object with at least one of radar, LIDAR, and sonar whereby range to the motion object is estimated; and adding a visual indicium of location into a display of said video file presented to a security system operator.

Another method embodiment for operation of a privacy security system includes: transforming at least one stream of compressed video files into surveillance alerts and notifications by performance in a processor the processes; determining a motion object by comparing each video frame with a subsequent frame; reading stored thresholds of motion, flight path parameters, and video block occupancy; decoding motion vectors from the compressed video files; comparing motion vectors to a motion magnitude threshold; and triggering a surveillance alert and notification on the condition that the motion vectors exceed the motion threshold thrice within a period of time for at least one of: both upward motion and downward motion, and, both leftward motion and rightward motion.

In an embodiment, the method also includes: decrementing from a Brownian motion threshold the total number of motion vectors associated with a motion object between entering and exiting the video stream; and triggering a surveillance alert and notification on the condition that the total number of motion vectors associated with a motion object exceeds a Brownian motion threshold.

In an embodiment, the method also includes: accumulating angular motion vectors for a motion object; and triggering a surveillance alert and notification on the condition that the accumulation of angular motion vectors exceeds four pi radians in at least one of vertical and horizontal displacement.

In an embodiment, the method also includes: adding to a store of a motion vectors for a motion object during operation; determining by Fourier analysis a frequency of reiteration in motion vectors of said motion object; and triggering a surveillance alert and notification.

In an embodiment, the method also includes: positioning air movement apparatus above and windward of a surveillor object.

CONCLUSION

Within this patent application, the term PRIVATION means an enhancement to privacy by excluding observation. The verb, process, or method step of privating is the action of frustrating photography, imaging, surveilling, or observing by an aerial vehicle commonly called a drone or remotely piloted vehicle such as battery powered rotating winged robot. Applicant discloses non-limiting exemplary processes for privating. Dispensing reflective or absorptive material would be privating against non-visible spectrum sensors.

Within this patent application, the term INTERPOSE means to place some barrier to transmission of optical information between a surveillor and a protected asset. The verb, process, or method step of interposing is the action of causing a barrier to take a position which blocks the view or sensor path of a surveillor to a protected asset.

Within this patent application, the term OBFUSCATE means to obscure, hide, distort, or affect the appearance of a protected asset. The verb, process, or method step of obfuscating is the act of configuring or adjusting attributes of a protected asset to render the imaging or sensor package of a surveillor dysfunctional or degraded.

Within this patent application, the term SURVEILLOR means a mobile platform which transports sensors or imaging apparatus. These may be radio controlled aircraft or attached to the ground by a cable or string and having powered or unpowered lifting surfaces.

As can be easily appreciated, the present invention can be further distinguished from conventional security camera systems by stereoscopic vision of objects which allows sequential ranging and distance estimation to determine hovering or lingering aerial behavior.

The present invention can be distinguished from conventional security camera systems by tracking blocks of pixels which traverse an array of tiles and trigger when arcing, looping, repeating, lingering, or reiterate a travel path through a previously traversed tile.

The present invention can be distinguished from conventional security camera system by extracting motion vectors from a plurality of compressed video frames from overlapped view spaces and determining a condition that the motion vectors fail to exit the overlapped view space within non-annoying time period set by the system.

Embodiments of the invention include more than one camera and a privation apparatus.

In embodiment of the method step, privating includes but is not limited to interposing and obfuscating.

In embodiments of the method, obfuscating includes changing the appearance, opacity, and geometry of the protected asset. Obfuscating may be activated by moving screens, roofs, walls, awnings, closing drapes, doors, windows, and making them reflective or opaque. Obfuscation may be accomplished by switching lighting, illumination, lasers, strobes, and projecting images on screens, surfaces, or clouds.

In embodiments of the method, interposing includes actuating water jets, smoke and fog machines, wind borne or aerial drones between the surveillor and the protected asset. Interposing may include directing biological agents or trained organisms.

The present invention may be easily distinguished from facial or object recognition systems by comparison of motion objects and motion vectors against thresholds for linger-time or smoothness. The present invention may be easily distinguished from video security systems by analysis of multiple streams or stereoscopic video files. The present invention may be easily distinguished from video recording systems by triggering actuators to change geometry or opacity or transparency or illumination of a protected asset.

Other actions include presentation of notifications and warnings by interposition of a screening matter.

Figure 1:
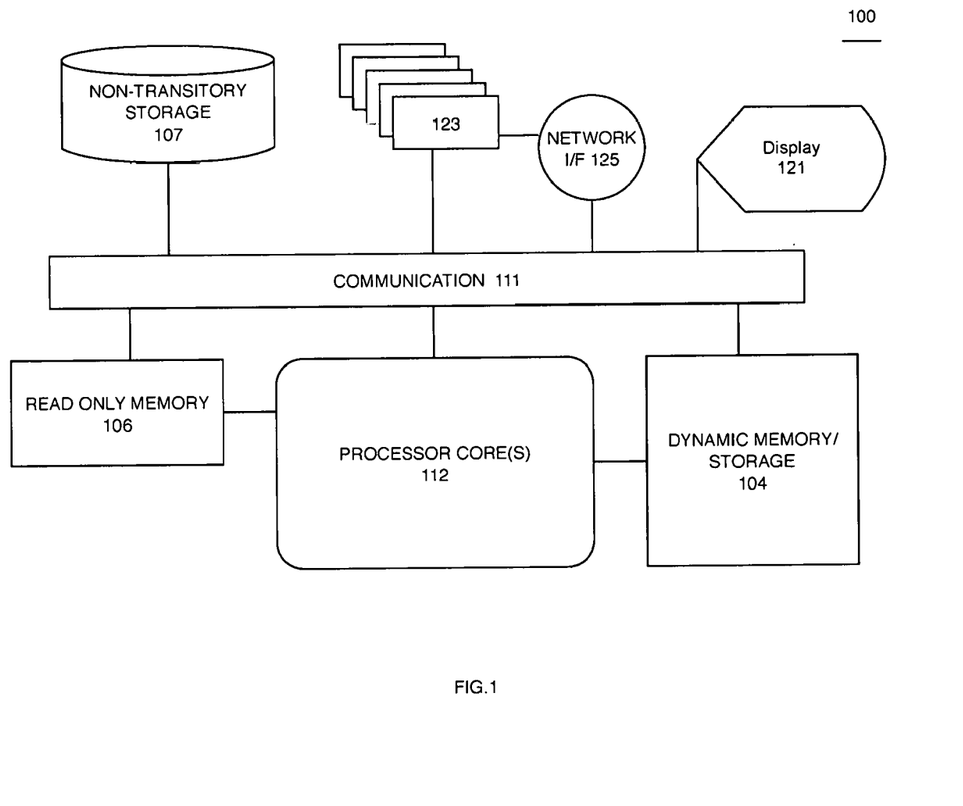
FIG. 1 is a block diagram of a circuit or processor apparatus for performing method steps encoded on tangible non-transitory computer readable media.

FIG. 1 is a block diagram of at least one exemplary processor suitable for performing the steps of a method to control optical sensors, displays, actuators, and aerial platforms that are embodiments of the invention.

The techniques described herein can be implemented in digital electronic circuitry, or in computer hardware, firmware, software, or in combinations of them. The techniques can be implemented as a computer program product, i.e., a computer program tangibly embodied in a non-transitory information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; internal hard disks or removable disks. The processor and the memory can be supplemented by, or incorporated in special purpose logic circuitry.

FIG. 1 is a block diagram of an exemplary processor that may be used to perform one or more of the functions described herein. Referring to FIG. 1, processor 100 may comprise an exemplary client or server process. Processor 100 comprises a communication mechanism or bus 111 for communicating information, and a processor core 112 coupled with bus 111 for processing information. Processor core 112 comprises at least one processor core, but is not limited to a processor core, such as for example, ARM™, Pentium™, etc.

Processor 100 further comprises a random-access memory (RAM), or other dynamic storage device 104 (referred to as main memory) coupled to bus 111 for storing information and instructions to be executed by processor 112. Main memory 104 also may be used for storing temporary variables or other intermediate information during execution of instructions by processor core 112.

Processor 100 also comprises a read only memory (ROM) and/or other static storage device 106 coupled to bus 111 for storing static information and instructions for processor core 112, and a non-transitory data storage device 107, such as a magnetic storage device or flash memory and its associated control circuits. Data storage device 107 is coupled to bus 111 for storing information and instructions.

Processor 100 may further be coupled to a display device 121 such a flat panel display, coupled to bus 111 for displaying information to a computer user. Voice recognition, optical sensor, motion sensor, microphone, keyboard, touch screen input, and pointing devices 123 may be attached to bus 111 or a network interface (wired or wireless) 125 for communicating selections and command and data input to processor core 112.

It is understood that the processor may be embedded within other circuits of the system as an embodiment of an ARM core or equivalent or as a virtual machine within a multi-core server.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A method for operation of a privacy security system comprising:
    capturing by an optical instrument at least one stream of video files;
    decoding said stream into pixel blocks of frequency coefficients;
    determining at least one pixel block containing an edge by characteristic frequency coefficients;
    compressing said stream of video files;
    determining a motion event upon a change in compression efficiency;
    determining a motion object by selecting pixel blocks with degraded compression efficiency;
    storing locations of the motion object over a sequence of video frames;
    reading stored thresholds of motion, flight path parameters, and video block occupancy; correlating locations of the motion object with at least one of radar, LIDAR, and sonar whereby range to the motion object is estimated; and
    adding a visual indicium of location into a display of said video file presented to a security system operator.

2. A method for operation of a privacy security system comprising: transforming at least one stream of compressed video files into surveillance alerts and notifications by performance in a processor the processes;
    determining a motion object by comparing each video frame with a subsequent frame;
    reading stored thresholds of motion, flight path parameters, and video block occupancy;
    decoding motion vectors from the compressed video files;
    comparing motion vectors to a motion magnitude threshold;
    triggering a surveillance alert and notification on the condition that the motion vectors exceed the motion threshold thrice within a period of time for at least one of: both upward motion and downward motion, and, both leftward motion and rightward motion;
    decrementing from a Brownian motion threshold the total number of motion vectors associated with a motion object between entering and exiting the video stream; and
    triggering a surveillance alert and notification on the condition that the total number of motion vectors associated with a motion object exceeds a Brownian motion threshold.

3. A method for operation of a privacy security system comprising: transforming at least one stream of compressed video files into surveillance alerts and notifications by performance in a processor the processes;
    determining a motion object by comparing each video frame with a subsequent frame;
    reading stored thresholds of motion, flight path parameters, and video block occupancy;
    decoding motion vectors from the compressed video files;
    comparing motion vectors to a motion magnitude threshold;
    triggering a surveillance alert and notification on the condition that the motion vectors exceed the motion threshold thrice within a period of time for at least one of: both upward motion and downward motion, and, both leftward motion and rightward motion;
    accumulating angular motion vectors for a motion object; and
    triggering a surveillance alert and notification on the condition that the accumulation of angular motion vectors exceeds four pi radians in at least one of vertical and horizontal.

4. A method for operation of a privacy security system comprising: transforming at least one stream of compressed video files into surveillance alerts and notifications by performance in a processor the processes;
    determining a motion object by comparing each video frame with a subsequent frame;
    reading stored thresholds of motion, flight path parameters, and video block occupancy;
    decoding motion vectors from the compressed video files;
    comparing motion vectors to a motion magnitude threshold;
    triggering a surveillance alert and notification on the condition that the motion vectors exceed the motion threshold thrice within a period of time for at least one of: both upward motion and downward motion, and, both leftward motion and rightward motion;
    adding to a store of a motion vectors for a motion object during operation;
    determining by Fourier analysis a frequency of reiteration in motion vectors of said motion object; and
    triggering a surveillance alert and notification.

* * * * *